June 10, 1969 — E. SEYFRIED — 3,448,694
CABLE GRIPPING DRIVE FOR SUSPENDED CABLE CARS
Filed Jan. 18, 1966 — Sheet 1 of 2
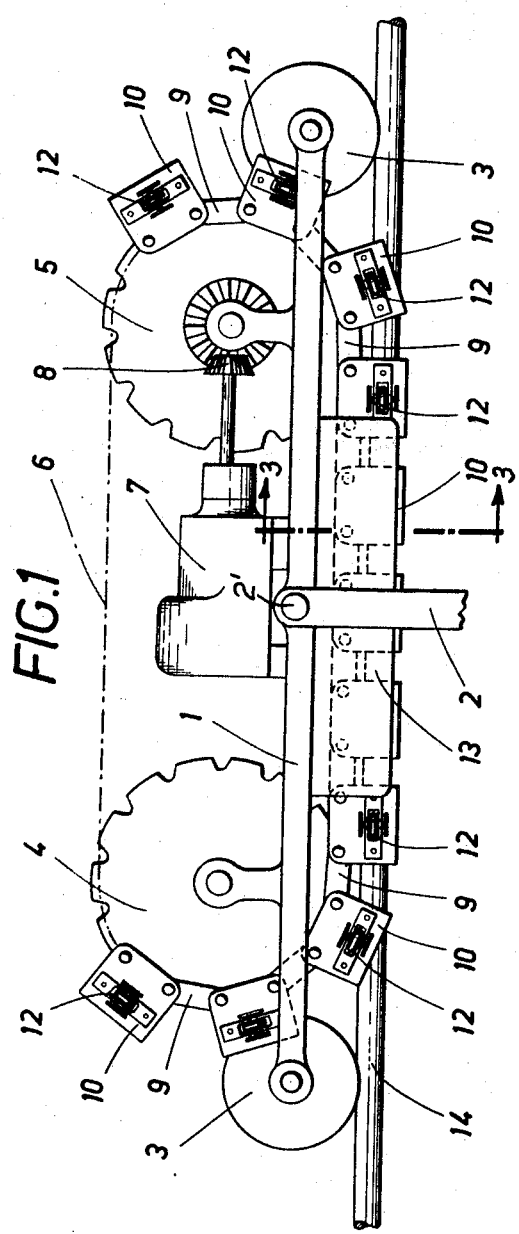
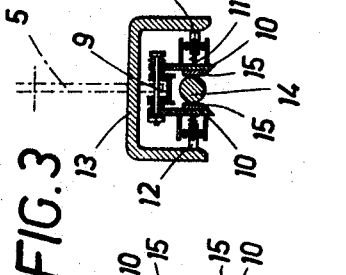
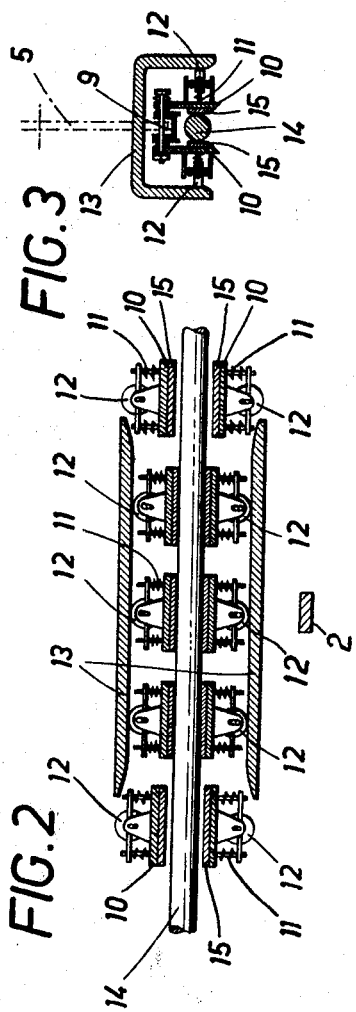
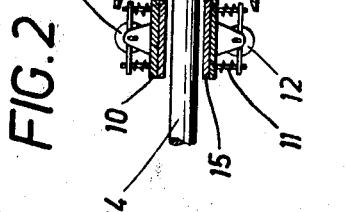
INVENTOR.
ERNST SEYFRIED
BY Kurt Kelman
AGENT INVENTOR.
ERNST SEYFRIED
BY Kurt Kelman
AGENT United States Patent Office 3,448,694
Patented June 10, 1969

3,448,694
CABLE GRIPPING DRIVE FOR SUSPENDED
CABLE CARS
Ernst Seyfried, Linz, Austria, assignor to Vereinigte Österreichische Eisen- und Stahlwerke Aktiengesellschaft, Linz, Austria
Filed Jan. 18, 1966, Ser. No. 521,376
Claims priority, application Austria, May 31, 1965, A 4,909/65
Int. Cl. B61c 11/02, 13/04; B61b 3/02
U.S. Cl. 105—30  6 Claims

ABSTRACT OF THE DISCLOSURE

In a tractor unit for a self-propelled cable car, the endless, driven chain track is pressed into frictional engagement with the carrying cable by pairs of clamping plates mounted on the chain links and extending on opposite sides of the cable in the track course adjacent the cable. For this purpose, gliding rollers are resiliently mounted on the clamping plates and a rail is mounted on the unit parallel to the cable and adjacent the course for engagement with the gliding rollers and for pressing the same into frictional engagement with the cable.

Background and summary and the invention

Self-propelling cars for suspension cableways are known. In case of a failure of the drive by the traction rope, these self-propelled cars are used for the rescue of passengers from cable cars which are on the line or for servicing purposes. The tractor unit of such cars comprises an engine, in most cases an Otto engine, which drives friction wheels that cooperate with the carrying cable. The resulting friction is too low, however, for reliably overcoming a relatively great upgrade of the carrying cable when the car is relatively heavy. A rescue car has also been proposed which is driven by two chain tracks. This design fails also to achieve the clamping force which is required for a steep carrying rope.

It is an object of the invention to provide for self-propelled cable cars a tractor unit which is relatively simple in design and ensures a reliable advance of the car on the carrying cable even when the same has a relatively large upgrade.

The invention is based on a chain-track-driven tractor unit for self-propelled cable cars and resides essentially in that the chain links are provided with or designed as clamping plates and an engaging bar or the like is provided for that course of the chain which faces the carrying cable and during the revolution of the chain urges pairs of clamping plates against the carrying cable from opposite sides. Thus, the tractor unit is held on the carrying cable by the clamping plates and the total friction which is required can be increased by an increase in the number of pairs of clamping plates which are effective at the same time. To urge the clamping plates against the carrying cable, their spacing from each other is reduced during the revolution of the chain as they run up on the engaging bar or the like. This results in a very simple design, which has the additional advantage that the clamping of the carrying cable is maintained throughout the movement along the engaging bar or the like and the carrying cable is not subjected to wear.

In a further development of the invention, the clamping plates carry rollers or slide shoes with which they roll or slide on the engaging bar or the like. The rollers or slide shoes may be secured by means of springs to the clamping plates or may be resilient in themselves. As a result, the clamping plates are resiliently urged against the carrying cable so that they can adapt themselves to irregularities of the carrying cable. The selection of the initial stress of the interposed springs enables a control of the clamping force or friction which will be obtained.

Within the scope of the basic concept of the invention, the running gear may be designed in various ways. For instance, only one track chain may be provided, each of the links of which is provided with two opposite, radially extending clamping plates, which are movable toward each other and are provided on the outside with the rollers or slide shoes. In another embodiment, only one track chain is provided and each link of the chain carries two clamping plates, which constitute two-armed levers, the first arms of which receive the carrying cable between them whereas the second arms are adapted to be spread apart by the engaging bar or the like as the same enters between said second arms. In this case, the engaging bar or the like may have the shape of a downwardly tapering wedge in cross-section above the carrying cable and may be loaded with the weight of the car. The heavier the car, the more deeply will the engaging bar be pulled in this case between the upper arms of the clamping plates so that a larger cross-section of the engaging bar will be effective, and the upper arms will be urged further apart and the lower arms of the clamping plates will be forced more tightly against the carrying cable disposed between them. This result in an increase of the clamping force and friction as the weight of the car increases.

Alternatively, two track chains may be provided accordingly to the invention on both sides of the carrying cable and extend parallel to each other or in a common plane and each of the links of said chains may carry a clamping plate. Where two opposed clamping plates, which do not constitute double-armed levers, are to be urged against the carrying cable, the engaging bar is suitably channel-shaped and the inside surfaces of the limbs of the U serve as contact or slide surfaces for engagement by the rollers or slide shoes of the clamping plates. It will be understood that the engaging bar or the channel flanges thereof will be chamfered at the ends to facilitate the trunning up of the rollers or slide shoes and to prevent impacts. The clamping plates may have a covering which is resilient or increases the friction. In this case, there is no need for interposing springs or the like between the rollers or slide shoes on the one hand and the clamping plates on the other hand.

The track chain may be used for guiding the car on the carrying cable. It is more favourable, however, to provide additional running gears, which take up forces that are transverse to the cable so that a smoother movement is ensured and the track chain serves only to produce the contact friction and to propel the car along the cable.

Brief description of drawing

Embodiments of the invention are shown by way of example in the accompanying drawing.

FIG. 1 is a side elevation showing the tractor unit of a self-propelled cable car.

FIG. 2 is a horizontal sectional view taken through the axis of the carrying cable.

FIG. 3 is a transverse sectional view taken on line 3—3 of FIG. 1.

*Detailed description of preferred embodiments*

Figure 4:
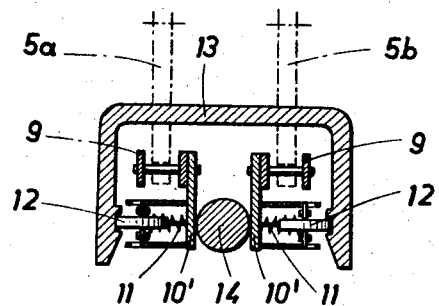
FIG. 4 is a sectional view, similar to FIG. 3, but showing two track chains with sprocket wheels above the chains.

The tractor unit comprises a frame 1, which is connected by bolt 2' to the suspension means 2 for the car and which is provided with running wheels 3. The sprocket wheels 4, 5 for an endless track chain 6 are mounted on the frame 1. The sprocket wheel 5 is driven by the motor 7 by means of a bevel gearing 8. Each of the chain links 9 carries a pair of clamping plates 10, which are movable toward each other into engagement with carrying cable 14 extending therebetween. Rollers 12 are mounted on the outside of each clamping plate 10, with springs 11 interposed. A rail means constituted by engaging bar 13 is associated with that course of the chain adjacent the carrying cable 14. During the movement of the chain, the rollers 12 of the clamping plates 10 run up on the inside surface of the flanges of the channel-shaped engaging bar 13 so that the clamping plates 10, having a resilient friction covering 15, are urged toward each other and against the carrying cable 14.

In the modification shown in FIG. 4, two parallel track chains and sprocket wheels 5a, 5b are provided. Each of the links 9 of the chains carries clamping plates 10'. The clamping plates 10' are again provided with rollers 12 and interposed springs 11. The common, channel-shaped engaging bar 13 urges the clamping plates 10' against the carrying cable 14.

Figure 5:
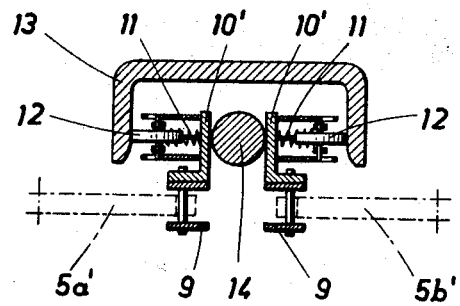
FIG. 5 is a sectional view, similar to FIG. 4, but with the track chains and sprocket wheels in a common plane.

The design shown in FIG. 5 differs from that in FIG. 4 in that the two track chains extend in a common plane and around horizontal sprocket wheels 5a', 5b'.

Figure 6:
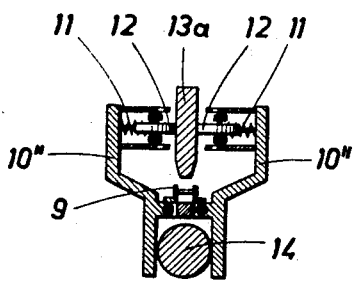
FIG. 6 is a sectional view, similar to FIG. 3, and showing a single track chain between a pair of clamping plates.
Figure 7:
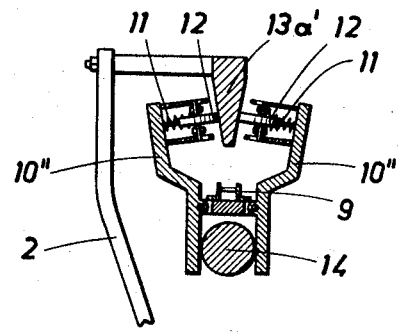
FIG. 7 is a sectional view, similar to FIG. 6, but with the suspension means connected to a wedge shaped bar between the clamping plates for exerting gradually increasing clamping pressure thereon.

In FIG. 6, each of the chain links 9 of a single track chain is provided with two clamping plates 10'', which form two-armed levers pivoted to the link. The lower arms of the clamping plates receive the carrying cable 14 between them. The engaging bar 13a enters between the upper arms and urges them apart with the aid of the rollers 12 and springs 11. A similar arrangement is shown in FIG. 7, in which the engaging bar 13a' has the shape of a downwardly tapering wedge in cross-section and has the suspension means 2 for the car connected to it. An increase in the weight of the car will thus have the result that the bar is pulled down further so that the clamping force acting on the carrying cable is increased owing to the wedge-shaped cross-section of the engaging bar 13a'. In this case the engaging bar must be mounted with a corresponding freedom of movement in the frame of the carrying frame.

What is claimed is:

1. In a tractor unit for a self-propelled cable car running on a carrying cable, and comprising a frame, an endless, driven chain track mounted on the frame and having chain links, one course of the endless chain track being adjacent the carrying cable, and pairs of clamping plates mounted on the chain links and extending on opposite sides of the cable in said course for frictional engagement with the cable, the improvement including
(1) a rail means fixedly mounted on the frame parallel to the cable and adjacent said one course, and
(2) sliding elements mounted on the clamping plates and resilient in respect thereto,
   (a) the rail means being arranged for engagement with the sliding elements and for pressing the same into frictional engagement with the cable in said one course.

2. In the tractor unit of claim 1, wherein the sliding elements are rollers, and spring means is interposed between the clamping plates and the rollers.

3. In the tractor unit of claim 1, wherein the endless chain track consists of a single link chain driven in a plane including the cable, the clamping plates are mounted on each side of said plane and parallel thereto for resilient movement towards said plane, and said sliding elements extend outwardly from said plates.

4. In the tractor unit of claim 3, wherein the rail means is a U-shaped channel member having a pair of flanges extending on each side of said plane for sliding engagement with the outwardly extending sliding elements.

5. In the tractor unit of claim 1, wherein the endless chain track consists of a single link chain driven in a plane including the cable, the clamping plates are mounted on each side of said plane and consist of two-armed levers pivoted to the chain links, one arm of the levers extending on opposite sides of the cable in said course for frictional engagement with the cable and the other arm of the levers carrying the sliding elements extending inwardly towards said plane, and said rail means consisting of a rail extending in said plane between the sliding elements in said one course and pressing the other arms of the levers apart, thus pivoting the one arms of the levers into frictional engagement with the cable.

6. In the tractor unit of claim 5, wherein the rail is mounted above the cable and is wedge-shaped, with an inward taper towards the cable, the wedge-shaped rail being mounted on the frame for gravity-actuated downward movement.

References Cited

UNITED STATES PATENTS

| 1,396,627 | 11/1921 | Denham | 105—30 |
| 1,522,332 | 1/1925 | Schmitz | 105—30 X |
| 1,987,104 | 1/1935 | Guthrie | 105—30 |
| 2,038,732 | 4/1936 | Guthrie | 105—30 |
| 2,132,558 | 10/1938 | Braune et al. | 105—148 |
| 2,143,403 | 1/1939 | Benson | 105—30 X |
| 2,312,518 | 3/1943 | Baldwin | 105—30 |

ARTHUR L. LA POINT, *Primary Examiner.*

H. BELTRAN, *Assistant Examiner.*

U.S. Cl. X.R.

105—150